J. W. ANTHOINE.
Friction Clutch for Lathes, &c.
No. 201,587. Patented March 26, 1878.
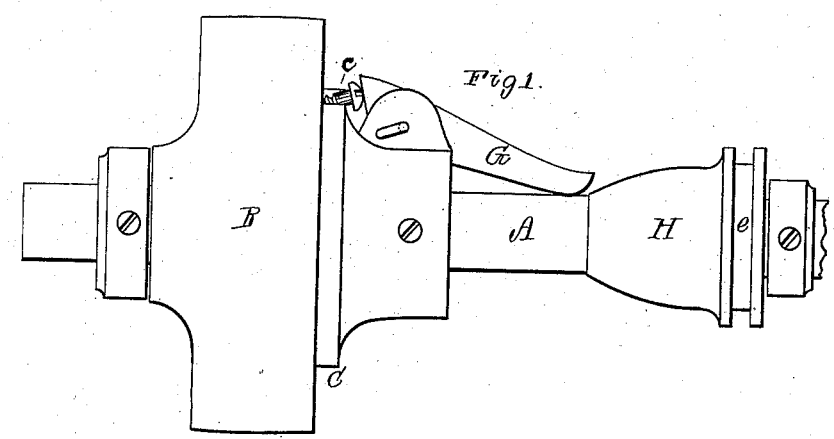
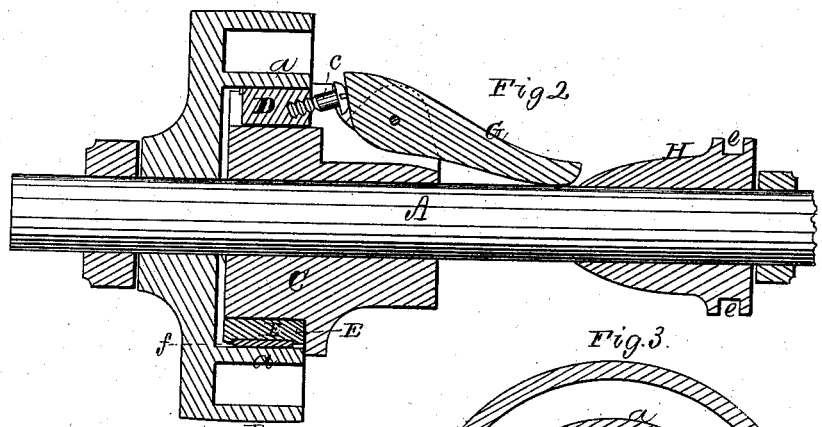
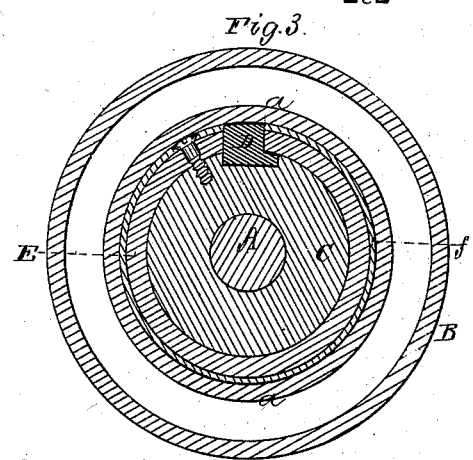
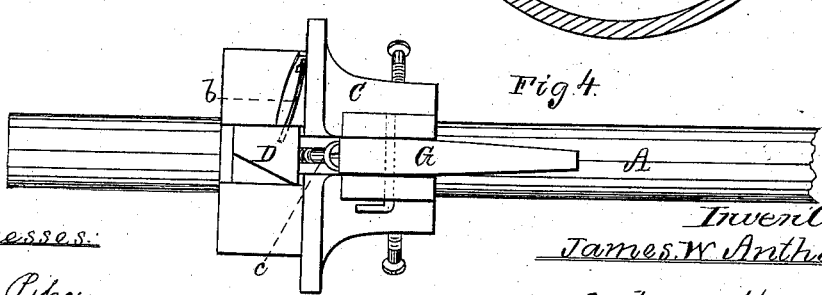
Witnesses:
S. N. Piper
L. N. Müller
Inventor
James W. Anthoine
by his attorney
R. H. Eddy

UNITED STATES PATENT OFFICE.

JAMES W. ANTHOINE, OF MILLER'S FALLS, MASSACHUSETTS.

IMPROVEMENT IN FRICTION-CLUTCHES FOR LATHES, &c.

Specification forming part of Letters Patent No. 201,587, dated March 26, 1878; application filed February 15, 1878.

*To all whom it may concern:*

Be it known that I, JAMES W. ANTHOINE, of Miller's Falls, of the county of Franklin and State of Massachusetts, have invented a new and useful Improvement in Friction-Clutches for Lathes or other machinery; and I do hereby declare the same to be described in the following specification and represented in the accompanying drawings, of which—

Figure 1 is a side elevation, Fig. 2 a longitudinal section, and Fig. 3 a transverse section, of a clutch of my improved kind. Fig. 4 is a top view of it without the pulley and expansive ring.

This clutch will answer for shafting, as well as for clutching a wheel or pulley to a shaft. The clutch hereinafter described is mainly composed of a head and encompassing expansive hoop, a wedge, a spring-lever, and frustum, arranged and applied to a shaft and a band wheel or pulley, as set forth.

In the drawings, A denotes the shaft, and B the wheel or pulley to revolve loosely on the shaft, except when clutched thereto. This wheel has a cylindrical flange, *a*, to encompass the movable wedge D and expansive hoop E of the clutch-head C. This head, shaped as shown, is fastened concentrically on or to the shaft. The wedge D is so applied to the clutch-head C as to be capable of sliding transversely therein, there being to the wedge a retractive spring, *b*, which is fixed to the head. A screw, *c*, screwed into one end of the wedge, has resting against its head a lever, G, pivoted to the head C, and arranged as represented. A tapering or conoidal frustum, H, provided with a groove, *e*, arranged in it, as shown, slides and turns freely on the shaft. The groove is to receive the prongs or end of a lever for moving the frustum endwise on the shaft. On pressing the said frustum toward the head C, the lever G will be moved so as to advance the wedge. Such wedge extends between the ends of an expansive hoop, E, which encompasses the head C, and at or near one end is fastened to such head. This hoop is covered with a friction-band, *f*, of rawhide or leather, but extends around it from end to end.

On expanding the hoop within the flange *a* of the pulley by means of the wedge, such hoop will clutch by friction the pulley to the head, whereby, in case the pulley may be in revolution, the shaft will be revolved. When the frustum is moved backward on the shaft, the spring will retract the wedge, and thereby enable the hoop by its inherent elasticity to contract within the flange *a* sufficiently for the pulley to revolve without revolving the hoop and its supporting-head and the shaft. In case of the clutch being applied to two shafts in line, one of them should have a flange or hollow cylindrical head to encompass the elastic hoop.

The screw *c* enables the wedge to be properly adjusted to the lever and the hoop, as occasion may require, or as the friction-band may become more or less worn.

I claim—

1. The friction-clutch, substantially as described, composed of the head C, encompassing-hoop E, wedge D, and its operative spring *b*, lever G, and frustum H, all being arranged and applied to the shaft A and the pulley B, essentially in manner and to operate as set forth.

2. The combination of the adjusting-screw *c* with the wedge D, hoop E, lever G, and frustum H, applied to the head C and the shaft A, as set forth.

JAMES W. ANTHOINE.

Witnesses:
ESTELLA M. THOMPSON,
F. M. THOMPSON.